(12) United States Patent
Gamaley et al.

(10) Patent No.: US 8,479,105 B2
(45) Date of Patent: Jul. 2, 2013

(54) MANAGING GRAPHICAL USER INTERFACE OBJECTS IN A COMPUTING ENVIRONMENT

(75) Inventors: Vladimir Gamaley, Rehovot (IL); Ilan Israel Nahum Klein, Rishon LeZion (IL); Amir Kleks, Hod-HaSharon (IL)

(73) Assignee: International Business Machines Corporation, Armonk., NY (US)

( * ) Notice: Subject to any disclaimer, the term of this patent is extended or adjusted under 35 U.S.C. 154(b) by 1203 days.

(21) Appl. No.: 12/053,733

(22) Filed: Mar. 24, 2008

(65) Prior Publication Data

US 2009/0241031 A1 Sep. 24, 2009

(51) Int. Cl.
*G06F 3/00* (2006.01)

(52) U.S. Cl.
USPC ........... 715/751; 715/753; 715/760; 715/781; 715/814

(58) Field of Classification Search
USPC .......................... 715/751, 753, 760, 781, 814
See application file for complete search history.

(56) References Cited

U.S. PATENT DOCUMENTS

| 6,981,223 | B2 | 12/2005 | Becker et al. | |
|---|---|---|---|---|
| 2004/0017396 | A1* | 1/2004 | Werndorfer et al. | 345/751 |
| 2004/0078441 | A1* | 4/2004 | Malik et al. | 709/206 |
| 2004/0228531 | A1 | 11/2004 | Fernandez et al. | |
| 2006/0242232 | A1* | 10/2006 | Murillo et al. | 709/204 |
| 2007/0180401 | A1 | 8/2007 | Singh | |
| 2007/0186173 | A1 | 8/2007 | Both et al. | |

* cited by examiner

*Primary Examiner* — Michael Roswell
(74) *Attorney, Agent, or Firm* — Patterson & Sheridan, LLP

(57) ABSTRACT

Systems and methods for managing graphical user interface objects in a computing environment are provided. The method comprises monitoring activity status associated with a graphical user interface object instantiated in a computing environment in response to establishment of a communication session with a remote party; and changing display status of the graphical user interface object when a time threshold expires in relation to the activity status associated with the graphical user interface object.

14 Claims, 6 Drawing Sheets

MANAGING GRAPHICAL USER INTERFACE OBJECTS IN A COMPUTING ENVIRONMENT

COPYRIGHT & TRADEMARK NOTICES

A portion of the disclosure of this patent document contains material, which is subject to copyright protection. The owner has no objection to the facsimile reproduction by any one of the patent document or the patent disclosure, as it appears in the Patent and Trademark Office patent file or records, but otherwise reserves all copyrights whatsoever.

Certain marks referenced herein may be common law or registered trademarks of third parties affiliated or unaffiliated with the applicant or the assignee. Use of these marks is for providing an enabling disclosure by way of example and shall not be construed to limit the scope of this invention to material associated with such marks.

TECHNICAL FIELD

The present invention relates generally to graphical user interfaces in computing environments and, more particularly, to a system and method for managing graphical user interface objects.

BACKGROUND

In a computing environment, a graphical user interface topology is utilized to display various objects or contents to a user. In some instances, particularly in text oriented application, the content is displayed in a rectangular shaped medium, generally referred to as a window.

For example, in instant text messaging applications, a first user using a first computing system opens an edit window to input a text message that is then transmitted to a second user using a second computing system. The transmitted message is typically displayed in what is commonly referred to as a chat window. Most chat windows have a view area in which the message is displayed and an edit area in which a user can input a reply to a received message.

Current chat applications open a separate chat window for every user that engaged in a chat session. For example, if user A is chatting with users B, C, D and E, then four chat windows are displayed on user's A display screen. As the number of chatting patrons and chat windows increases, managing the open chat sessions becomes more impractical. Further, each open and inactive chat session consumes computing resources that could be utilized otherwise.

Thus, methods and systems are needed that can overcome the aforementioned shortcomings by providing a solution to manage inactive chat session or windows that may be no longer needed.

SUMMARY

The present disclosure is directed to systems, methods and corresponding products that facilitate managing graphical user interface objects in a computing environment.

For purposes of summarizing, certain aspects, advantages, and novel features of the invention have been described herein. It is to be understood that not all such advantages may be achieved in accordance with any one particular embodiment of the invention. Thus, the invention may be embodied or carried out in a manner that achieves or optimizes one advantage or group of advantages without achieving all advantages as may be taught or suggested herein.

In accordance with one embodiment, a method for managing graphical user interface objects in a computing environment is provided. The method comprises monitoring activity status associated with a graphical user interface object instantiated in a computing environment in response to establishment of a communication session with a remote party; and changing display status of the graphical user interface object when a time threshold expires in relation to the activity status associated with the graphical user interface object.

In accordance with one aspect of the invention, a system comprising one or more logic units is provided. The one or more logic units are configured to perform the functions and operations associated with the above-disclosed methods. In yet another embodiment, a computer program product comprising a computer useable medium having a computer readable program is provided. The computer readable program when executed on a computer causes the computer to perform the functions and operations associated with the above-disclosed methods.

One or more of the above-disclosed embodiments in addition to certain alternatives are provided in further detail below with reference to the attached figures. The invention is not, however, limited to any particular embodiment disclosed.

BRIEF DESCRIPTION OF THE DRAWINGS

Embodiments of the present invention are understood by referring to the figures in the attached drawings, as provided below.

Features, elements, and aspects of the invention that are referenced by the same numerals in different figures represent the same, equivalent, or similar features, elements, or aspects, in accordance with one or more embodiments.

DETAILED DESCRIPTION OF PREFERRED EMBODIMENTS

The present disclosure is directed to systems and corresponding methods that facilitate managing graphical user interface objects in a computing environment.

In the following, numerous specific details are set forth to provide a thorough description of various embodiments of the invention. Certain embodiments of the invention may be practiced without these specific details or with some variations in detail. In some instances, certain features are described in less detail so as not to obscure other aspects of the invention. The level of detail associated with each of the elements or features should not be construed to qualify the novelty or importance of one feature over the others.

Figure 1:
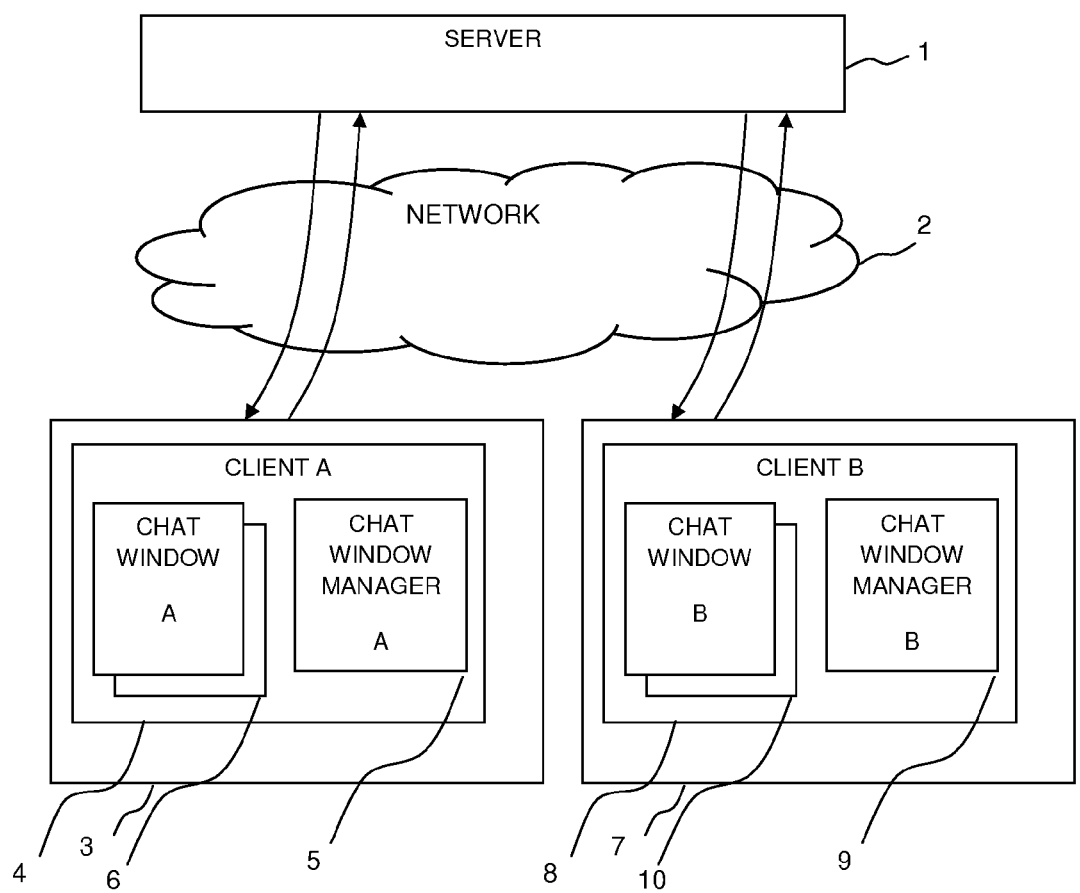
FIG. 1 illustrates an exemplary network environment in accordance with one or more embodiments, wherein two client computers communicate over a network supported by a server system.

Referring to FIG. 1, an exemplary network environment is illustrated in which two computing systems 3, 7 are configured to execute client software (hereafter clients) 4, 8 in communication with a remote server 1 over network 2. Each client may instantiate one or more graphical user interface objects (e.g., chat windows) for the purpose of display on the respective computing system. The graphical user interface objects may be configured to allow a user to input content into an edit area, and to view content received from another user in a view pane.

In the following, one or more embodiments are disclosed, by way of example, as applicable to chat windows. Chat windows are commonly used in conjunction with messaging protocols that allow communication of content between users of various computing systems connected to a network. It is noteworthy, however, that the concepts and principles discussed herein may be equally applicable, with some modification, to other objects instantiated in a computing environment, regardless of whether such objects are graphically displayable.

In accordance with one embodiment, clients 4, 8 may comprise one or more computing units or modules (e.g., chat window managers 5, 9) configured to manage multiple chat windows 6, 10. For example, chat window managers 5, 9 may manage the instantiation, opening and closing of chat windows, show the list of open chat windows 5, 9 and the respective timing information associated therewith. Chat window managers 5, 9 may also monitor the number and calculate the length of time each chat window or chat session remains inactive and thus becomes a candidate for termination, as provided in further detail below.

Figure 2:
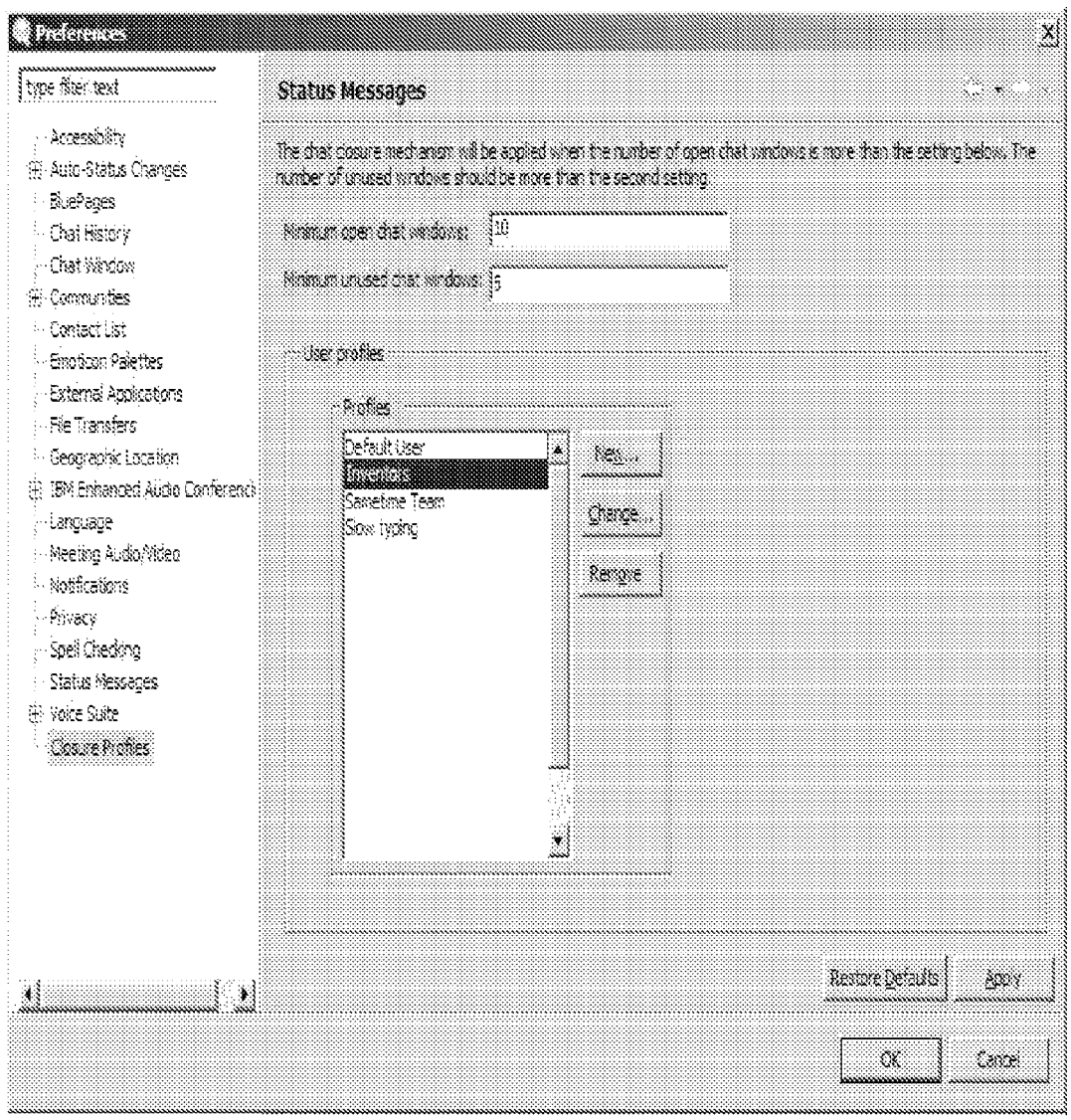
FIG. 2 is an exemplary user interface, in accordance with one embodiment, for managing graphical user interface objects associated with one or more groups of users.

Referring to FIG. 2, an exemplary implementation of a graphical user interface menu in accordance with one embodiment is provided, wherein a user or system administrator, for example, can define a threshold for the minimum number of open chat windows and the minimum number of unused chat windows for each user or for a group of users belonging to a certain class or profile. In other words, one or more user profiles (e.g., default user, inventors, slow typing, preferred, etc.) may be defined, and each user may be assigned to one or more profiles.

Each user or each profile may be assigned one or more thresholds to control the number of chat windows that remain open for each user. For example, a default user profile may be configured to have an expiration time of one hour (e.g., a chat window with such profile designation will be closed or will enter an inactive state after an hour of inactivity). A preferred user profile may be configured to have an expiration time of infinity (e.g., a chat window with such profile designation will never be closed). And, a slow typing user profile may have an expiration time of two hours, for example. In certain embodiments, each new user belongs to the default group, unless explicitly designated otherwise.

In some embodiments, each profile may be associated with at least one or two threshold values, such that for example a first threshold may be set at a value X and the second threshold at a value Y, wherein a chat window management process is activated if the number of open chat windows (whether active or inactive) exceeds X; or the number of inactive (e.g., unused) chat windows exceeds Y. The active or non-active status of a chat window may be determined based on the level of activity or the level of engagement of a user that provides input to said chat window either locally or remotely.

For example, as shown in FIG. 2, the threshold values for X and Y for the inventors group may be set to 10 and 5, respectively. Thus, when a user that belongs to the inventors group, for example, is engaged in multiple chat sessions, if the number of open chat windows (whether active or inactive) exceeds 10, then a window monitoring agent is activated. Further, in some implementations, when the number of inactive windows exceeds 5, then the window monitoring agent is activated. Such mechanism allows a user to manage and monitor several chat windows in a convenient manner, as the user will no longer need to manually keep track of each window.

A chat window may be deemed as active if content (e.g., text, audio, video or other type of media) has been inputted to or viewed in the chat window by either a remote or local user within a predefined time threshold. A chat window may be deemed as inactive, if either one or both the remote and the local users have been inactive with respect to inputting or viewing content to or from the chat window. The activity status for a chat window may be determined, in one or more embodiments, with respect to status information provided by server 1 or clients 4, 8.

For example, in an instant messaging application, each user may set his or her activity status (e.g., busy, offline, away, meeting, etc.). Such status information may be monitored by a local module (e.g., chat window managers 5, 9) or a remote module (e.g., server 1). If a chat window for an inactive user is open on a computing system, the length of inactivity for that chat window may be monitored by a monitoring agent, and if the length of inactivity exceeds a certain predetermined threshold (e.g., 10 minutes) as defined for the profile to which the user belongs, then the respective chat window would be considered inactive and possibly a candidate for closure (i.e., termination).

To elaborate, in the following example, assume C to be the number of open chat windows. If C is greater than a certain threshold value that causes a window monitoring agent to be activated. Alternatively, assume that Z is the number of open chat windows that are considered to be inactive. If Z is greater than a predefined threshold value that causes the window monitoring agent to be activated. For each chat window, the time of the last user activity is recorded (e.g., marked as L(i) for user "i"), as well as the cumulative inactivity period (e.g., the time the user was away or in a meeting and maybe even logged out).

In this exemplary embodiment, the variable L(i) may change to the current system time when the user sends a message to user "i" or when the user receives a message from user "i" or when the user inputs a message. The following algorithm covers an exemplary embodiment of the above-noted process, wherein W denotes a period of inactivity for a window "i".

---

1) Is the number of open chat windows greater than C
If yes:
2) Set the number of windows to be closed to 0 (N:=0)
3) For each user "i" that has an open chat window,
    define $D(i) = ( (<currentTime>-W) - L(i) - X(i) )$, and
    check if $(D(i) > 0)$
    if Yes, then increment N (N:=N+1) /*this chat window is a
    candidate for being closed*/
4) If (N > Z) then close the candidate windows or prompt user to select windows to be closed.

---

Referring back to FIG. 2, in some embodiments, it may be possible to add or edit a profile by interacting with a user interface element (e.g., selecting new or change button), or it may be possible to remove any profile (preferably other than the default user profile). In one embodiment, when the profile is removed, the users associated with that profile are automatically considered as part of the default user profile, unless they are assigned otherwise.

Figure 3A:
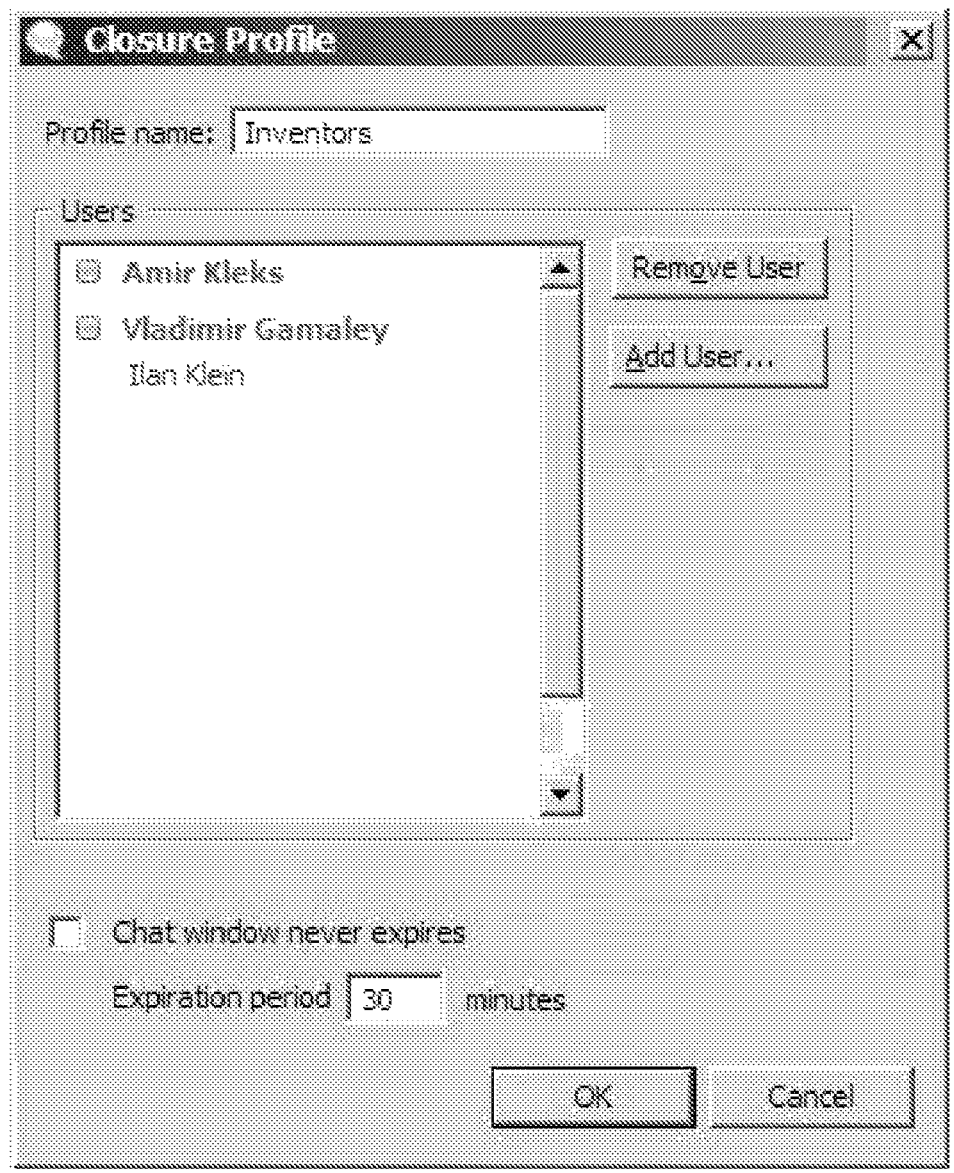
FIG. 3A is an exemplary user interface, in accordance with one embodiment, for managing user profiles associated with graphical user interface objects.

Now referring to FIG. 3A, a graphical user interface menu may be implemented to allow a user or system administrator add or remove a user to or from a certain profile. In the exemplary implementation illustrated, a remove user button may be configured to remove a selected user from a certain profile, and an add user button may be utilized to open a search dialog, for example, to find a user from a user list. As noted earlier, a designation (e.g., never expires checkbox) may be selected for a particular user.

Figure 3B:
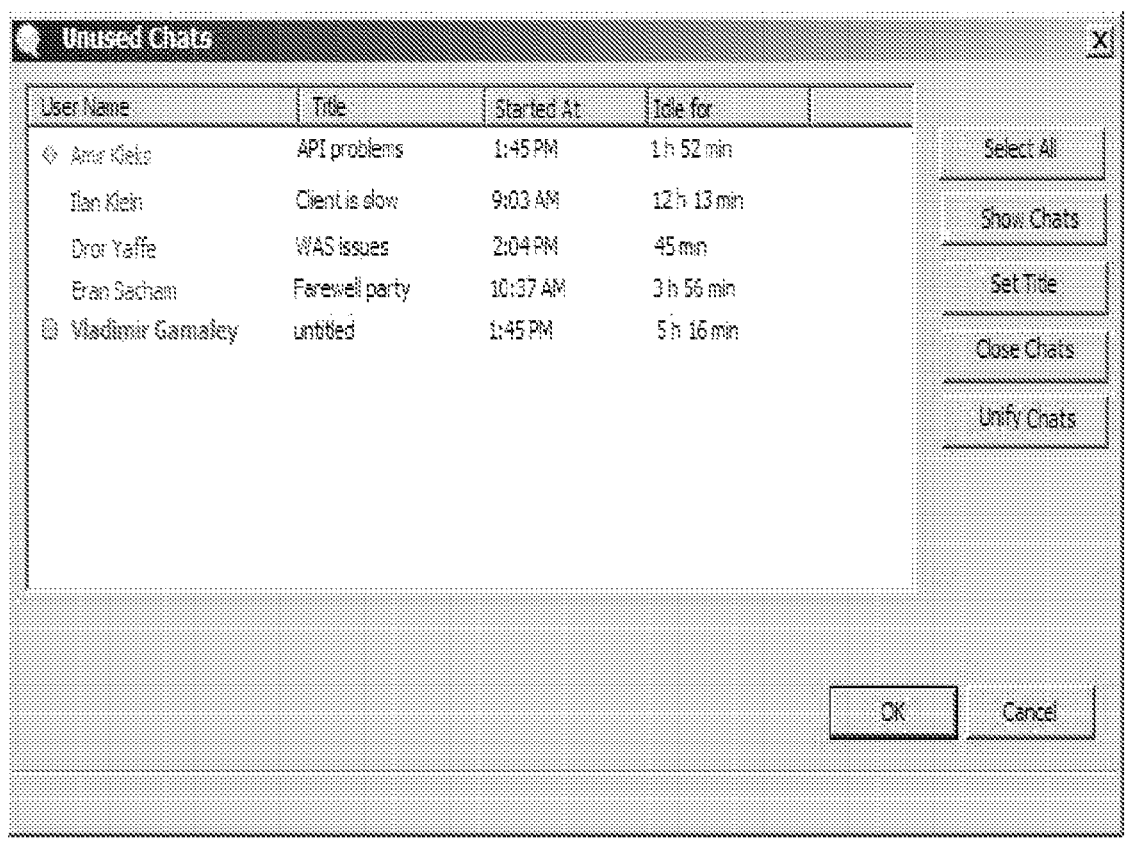
FIG. 3B is an exemplary user interface for grouping graphical user interface objects in association with a respective user profile and timing attributes, in accordance with one embodiment.

Referring to FIG. 3B, in one embodiment, a closure window may be implemented and displayed in response to detecting a period of inactivity for one or more windows. The closure window may show a list of one or more chat windows that are candidates to be closed. The closure window, for each candidate chat window, may for example provide information comprising the user's logical name, the start time of the chat and the inactivity time for the respective window. In some embodiments, a title may be also added to identify the chat window.

Optionally, by for example right clicking on the header of the list, more fields can be added that provide information about a user's profile group and time D(i) providing information for example, for the length of time a chat window exceeded a predetermined time threshold. As shown in FIG. 3B, in some embodiments, the following example options may be provided in the closure window:

1) "Select All" may result in all chat windows to be shown in a list. In such a case, the select all button will change into "Show only exceeding chats" that will result in displaying a list including the windows to be closed.
2) "Unify Chats" may take the chosen chat windows (inside the list) and may put the chat windows in one tabbed chat window. These chat windows may disappear from the desktop (thus providing additional desktop real estate). Desirably, one or more of such chat windows may not appear again in the "unused chats" window. Preferably, this button won't close the window (unless after activating it, no windows are left in the list).
3) "Deselect all"—may deselect all the items in the list.
4) "Close Chats"—may close all the selected chat windows chosen inside the list.
5) "Show Chats"—may popup all the selected chat windows.
6) "OK/Cancel"—may close the closure window, or in some embodiment may snooze the closure window for a predefine snooze time S.

In one embodiment, when a chat line is selected, it may be possible to right click on it to access a menu, for example, wherein the menu may provide the following options:

1) Edit user profile—may open the appropriate user profile for editing; and
2) Set Never Expire—may set a "never expire" mark on the target chat window.

In one embodiment, an option may be added to a menu comprising a user's buddy list, for example, to edit user profiles for each user in the buddy list. This option may open the appropriate profile for the selected user, or if the user is not assigned a profile, it may open the closure profiles preferences tab.

In different embodiments, the invention can be implemented either entirely in the form of hardware or entirely in the form of software, or a combination of both hardware and software elements. For example, computing systems and software modules disclosed herein may comprise a controlled computing system environment that can be presented largely in terms of hardware components and software code executed to perform processes that achieve the results contemplated by the system of the present invention.

Figure 4:
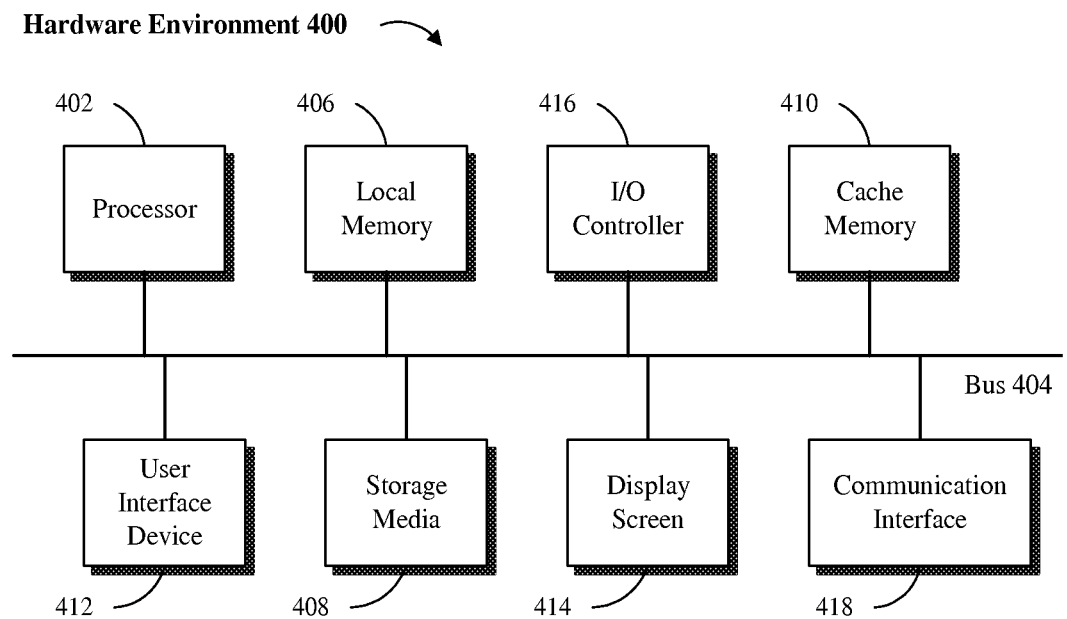
FIGS. 4 and 5 are block diagrams of hardware and software environments in which a system of the present invention may operate, in accordance with one or more embodiments.
Figure 5:
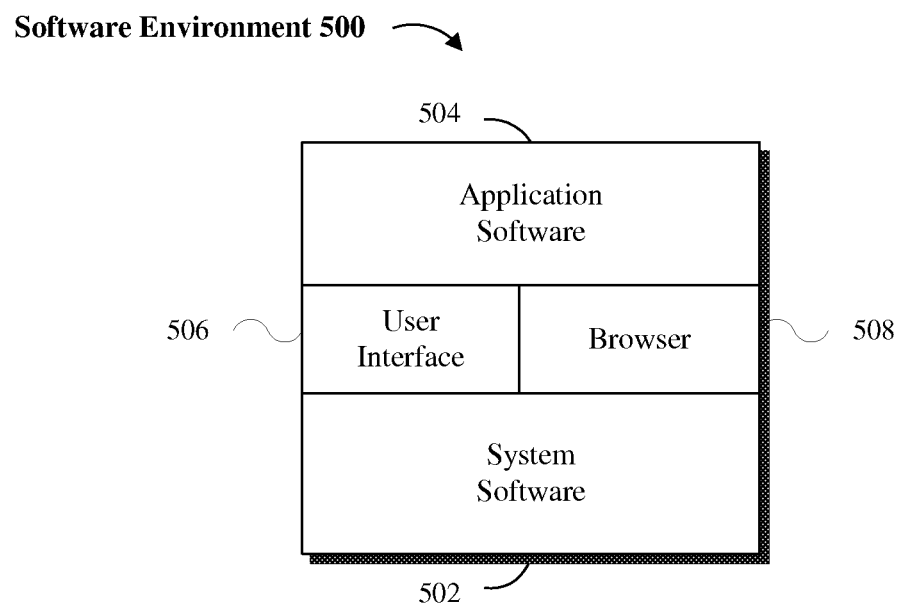

Referring to FIGS. 4 and 5, a computing system environment in accordance with an exemplary embodiment is composed of a hardware environment 400 and a software environment 500. The hardware environment 400 comprises the machinery and equipment that provide an execution environment for the software; and the software provides the execution instructions for the hardware as provided below.

As provided here, the software elements that are executed on the illustrated hardware elements are described in terms of specific logical/functional relationships. It should be noted, however, that the respective methods implemented in software may be also implemented in hardware by way of configured and programmed processors, ASICs (application specific integrated circuits), FPGAs (Field Programmable Gate Arrays) and DSPs (digital signal processors), for example.

Software environment 500 is divided into two major classes comprising system software 502 and application software 504. System software 502 comprises control programs, such as the operating system (OS) and information management systems that instruct the hardware how to function and process information.

In one embodiment, software modules may be implemented as system software 502 and application software 504 executed on one or more hardware environments. Application software 504 may comprise but is not limited to program code, data structures, firmware, resident software, microcode or any other form of information or routine that may be read, analyzed or executed by a microcontroller.

In an alternative embodiment, the invention may be implemented as computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate or transport the program for use by or in connection with the instruction execution system, apparatus or device.

The computer-readable medium can be an electronic, magnetic, optical, electromagnetic, infrared, or semiconductor system (or apparatus or device) or a propagation medium. Examples of a computer-readable medium include a semiconductor or solid-state memory, magnetic tape, a removable computer diskette, a random access memory (RAM), a read-only memory (ROM), a rigid magnetic disk and an optical disk. Current examples of optical disks include compact disk read only memory (CD-ROM), compact disk read/write (CD-R/W) and digital videodisk (DVD).

Referring to FIG. 4, an embodiment of the system software 502 and application software 504 can be implemented as computer software in the form of computer readable code executed on a data processing system such as hardware environment 400 that comprises a processor 402 coupled to one or more computer readable media or memory elements by way of a system bus 404. The computer readable media or the memory elements, for example, can comprise local memory 406, storage media 408, and cache memory 410. Processor 402 loads executable code from storage media 408 to local memory 406. Cache memory 410 provides temporary storage to reduce the number of times code is loaded from storage media 408 for execution.

A user interface device 412 (e.g., keyboard, pointing device, etc.) and a display screen 414 can be coupled to the computing system either directly or through an intervening I/O controller 416, for example. A communication interface unit 418, such as a network adapter, may be also coupled to the computing system to enable the data processing system to communicate with other data processing systems or remote printers or storage devices through intervening private or public networks. Wired or wireless modems and Ethernet cards are a few of the exemplary types of network adapters.

In one or more embodiments, hardware environment 400 may not include all the above components, or may comprise other components for additional functionality or utility. For example, hardware environment 400 may be a laptop computer or other portable computing device embodied in an embedded system such as a set-top box, a personal data assistant (PDA), a mobile communication unit (e.g., a wireless phone), or other similar hardware platforms that have information processing and/or data storage and communication capabilities.

In certain embodiments of the system, communication interface 418 communicates with other systems by sending and receiving electrical, electromagnetic or optical signals that carry digital data streams representing various types of information including program code. The communication may be established by way of a remote network (e.g., the Internet), or alternatively by way of transmission over a carrier wave.

Referring to FIG. 5, system software 502 and application software 504 can comprise one or more computer programs that are executed on top of operating system 112 after being loaded from storage media 408 into local memory 406. In a client-server architecture, application software 504 may comprise client software and server software. For example, in one embodiment of the invention, client software is executed on computing systems 110 or 120 and server software is executed on a server system (not shown).

Software environment 500 may also comprise browser software 508 for accessing data available over local or remote computing networks. Further, software environment 500 may comprise a user interface 506 (e.g., a Graphical User Interface (GUI)) for receiving user commands and data. Please note that the hardware and software architectures and environments described above are for purposes of example, and one or more embodiments of the invention may be implemented over any type of system architecture or processing environment.

It should also be understood that the logic code, programs, modules, processes, methods and the order in which the respective steps of each method are performed are purely exemplary. Depending on implementation, the steps may be performed in any order or in parallel, unless indicated otherwise in the present disclosure. Further, the logic code is not related, or limited to any particular programming language, and may comprise of one or more modules that execute on one or more processors in a distributed, non-distributed or multi-processing environment.

Therefore, it should be understood that the invention can be practiced with modification and alteration within the spirit and scope of the appended claims. The description is not intended to be exhaustive or to limit the invention to the precise form disclosed. These and various other adaptations and combinations of the embodiments disclosed are within the scope of the invention and are further defined by the claims and their full scope of equivalents.

What is claimed is:

1. A method for managing graphical user interface objects in a computing environment, the method comprising:
monitoring activity status associated with a plurality of distinct graphical user interface objects instantiated in a computing environment in response to establishment of a communication session with a remote party; and
changing display status of one or more of the plurality of graphical user interface objects when a time threshold expires in relation to the activity status associated with the one or more graphical user interface objects;
wherein the monitoring and the changing processes are activated in response to determining (i) that a first number of user interface objects are instantiated and (ii) that a second number of instantiated user interface objects are in an inactive status, and wherein changing the display status comprises removing the graphical user interface object from a display presenting the graphical user interface; and
unifying each user interface object not removed from the display into a single tabbed interface object having a plurality of tabs, and wherein each tab corresponds to one of the user interface objects not removed from the display.

2. The method of claim 1 wherein the activity status associated with the graphical user interface object is dependent on engagement status of the remote party in the communication session.

3. The method of claim 1 wherein the activity status associated with the graphical user interface object is determined as inactive, if the remote party is busy for a predetermined time period.

4. The method of claim 1 wherein the activity status associated with the graphical user interface object is determined as inactive, if the remote party is away for a predetermined time period.

5. The method of claim 1 wherein the activity status associated with the graphical user interface object is determined as inactive, if the remote party is logged off for a predetermined time period.

6. The method of claim 1 further comprising assigning a first remote party to a first class and a second remote party to a second class, wherein a first time threshold is assigned to the first class and a second time threshold is assigned to the second class.

7. The method of claim 1 further comprising displaying status of one or more graphical user interface objects when the time threshold expires in relation to the activity status associated with said one or more graphical user interface object, so that a user may select at least one of said one or more graphical user interface objects to be closed.

8. The method of claim 1 further comprising closing a respective communication session associated with the graphical user interface object when the time threshold expires.

9. A system for managing graphical user interface objects in a computing environment, the system comprising:
a processor;
a memory;
a logic unit, executed on the processor, for monitoring activity status associated with a plurality of distinct graphical user interface objects instantiated in a computing environment in response to establishment of a communication session with a remote party, and
a logic unit, executed on the processor, for changing display status of one or more of the plurality of graphical user interface objects when a time threshold expires in relation to the activity status associated with the graphical user interface objects; and
wherein the monitoring and the changing processes are activated in response to determining (i) that a first number of user interface objects are instantiated and (ii) that a second number of instantiated user interface objects are in an inactive status, and wherein changing the display status comprises removing the graphical user interface object from a display presenting the graphical user interface; and unifying each user interface object not removed from the display into a single tabbed interface object having a plurality of tabs, and wherein each tab corresponds to one of the user interface objects not removed from the display.

10. The system of claim 9 wherein the activity status associated with the graphical user interface object is dependent on engagement status of the remote party in the communication session.

11. The system of claim 9 wherein the activity status associated with the graphical user interface object is determined as inactive, if the remote party is busy for a predetermined time period.

12. The system of claim 9 wherein the activity status associated with the graphical user interface object is determined as inactive, if the remote party is away for a predetermined time period.

13. The system of claim 9 wherein the activity status associated with the graphical user interface object is determined as inactive, if the remote party is logged off for a predetermined time period.

14. A computing program product comprising logic code for execution on a computing system, wherein execution of the logic causes the computing system to:

monitor activity status associated with a plurality of distinct graphical user interface objects instantiated in a computing environment in response to establishment of a communication session with a remote party;

change display status of one or more of the plurality of graphical user interface objects when a time threshold expires in relation to the activity status associated with the graphical user interface object;

wherein the monitoring and the changing processes are activated in response to determining (i) that a first number of user interface objects are instantiated and (ii) that a second number of instantiated user interface objects are in an inactive status, and wherein changing the display status comprises removing the graphical user interface object from a display presenting the graphical user interface; and unifying each user interface object not removed from the display into a single tabbed interface object having a plurality of tabs, and wherein each tab corresponds to one of the user interface objects not removed from the display.

* * * * *